(12) United States Patent
Srivastava et al.

(10) Patent No.: US 11,343,641 B2
(45) Date of Patent: May 24, 2022

(54) METHODS FOR LEARNING DEPLOYMENT ENVIRONMENT SPECIFIC FEATURES FOR SEAMLESS ACCESS

(71) Applicant: Carrier Corporation, Palm Beach Gardens, FL (US)

(72) Inventors: Kunal Srivastava, Manchester, CT (US); Pedro Fernandez-Orellana, Shanghai (CN); Ankit Tiwari, South Windsor, CT (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 17/057,035

(22) PCT Filed: Apr. 17, 2019

(86) PCT No.: PCT/US2019/027829
§ 371 (c)(1),
(2) Date: Nov. 19, 2020

(87) PCT Pub. No.: WO2019/226257
PCT Pub. Date: Nov. 28, 2019

(65) Prior Publication Data
US 2021/0314728 A1 Oct. 7, 2021

(30) Foreign Application Priority Data
May 21, 2018 (CN) .......................... 201810492196.9

(51) Int. Cl.
*H04W 4/02* (2018.01)
*H04B 17/318* (2015.01)
*H04W 4/029* (2018.01)

(52) U.S. Cl.
CPC .......... *H04W 4/023* (2013.01); *H04B 17/318* (2015.01); *H04W 4/029* (2018.02)

(58) Field of Classification Search
CPC ..... H04W 4/023; H04W 4/029; H04B 17/318
(Continued)

(56) References Cited

U.S. PATENT DOCUMENTS 9,462,423 B1 10/2016 Rivlin et al.
2010/0238862 A1* 9/2010 Davidson .............. H04W 4/029
370/328

(Continued)

FOREIGN PATENT DOCUMENTS

CN 105632000 A 6/2016
WO 2016087541 A1 6/2016
(Continued)

OTHER PUBLICATIONS

Yang, et al.; "An Intelligent Automated Door Control System Based on a Smart Camera"; MDPI Sensors, 13(5), 5923-5936; 2013; Internet; URL: http://www.mdpi.com/1424-8220/13/5/5923; 10 pgs.
(Continued)

*Primary Examiner* — Ted M Wang
(74) *Attorney, Agent, or Firm* — Cantor Colburn LLP

(57) ABSTRACT

A method of determining a location of one or more access controls utilizing an individual carrying a mobile device is provided. The method including: detecting a first wireless signal; determining a received signal strength indicator (RSSI) of the first wireless signal; determining a distance between a mobile device and a first access control in response to the RSSI of the first wireless signal; determining a location of the mobile device when the first wireless signal is detected; and determining a location of the first access control in response to the location of the mobile device and the distance between the mobile device and the first access control.

19 Claims, 4 Drawing Sheets

(58) Field of Classification Search
USPC ..................................................... 455/456.1
See application file for complete search history.

(56) References Cited

U.S. PATENT DOCUMENTS

| | | |
|---|---|---|
| 2011/0148633 A1 | 6/2011 | Kohlenberg et al. |
| 2014/0104429 A1 | 4/2014 | Ward et al. |
| 2015/0200925 A1 | 7/2015 | Lagerstedt et al. |
| 2016/0021511 A1* | 1/2016 | Jin ........................ H04W 4/021 455/457 |
| 2017/0076523 A1 | 3/2017 | Rumble et al. |
| 2017/0094635 A1 | 3/2017 | Liu et al. |
| 2017/0124773 A1 | 5/2017 | Busch-Serensen et al. |
| 2017/0148244 A1 | 5/2017 | Ahearn et al. |
| 2017/0228953 A1 | 8/2017 | Lupovici |
| 2017/0236347 A1 | 8/2017 | Drako et al. |
| 2017/0289130 A1 | 10/2017 | Park et al. |

FOREIGN PATENT DOCUMENTS

| | | |
|---|---|---|
| WO | 2016198780 A1 | 12/2016 |
| WO | 2017180388 A1 | 10/2017 |

OTHER PUBLICATIONS

Notification of Transmittal of the International Search Report for International Application No. PCT/US2019/027829; Report dated Jun. 24, 2019; 7 pages.

Written Opinion of the International Searching Authority for International Application No. PCT/US2019/027829; Report dated Jun. 24, 2019; 8 pages.

* cited by examiner

METHODS FOR LEARNING DEPLOYMENT ENVIRONMENT SPECIFIC FEATURES FOR SEAMLESS ACCESS

CROSS-REFERENCE TO RELATED APPLICATIONS

This application is a National Stage Application of International Application No. PCT/US2019/027829 filed Apr. 17, 2019, which claims the benefit of Chinese Application No. 201810492196.9 filed May 21, 2018, the disclosures of which are incorporated herein by reference in their entirety.

BACKGROUND

The subject matter disclosed herein generally relates to the field of access control systems, and more particularly to an apparatus and method for operating access control systems.

Existing access controls may allow an individual to unlock rooms via a key a mobile device but may have difficulty determining where the room is in relation to other rooms.

BRIEF SUMMARY

According to an embodiment, a method of determining a location of one or more access controls utilizing an individual carrying a mobile device is provided. The method including: detecting a first wireless signal; determining a received signal strength indicator (RSSI) of the first wireless signal; determining a distance between a mobile device and a first access control in response to the RSSI of the first wireless signal; determining a location of the mobile device when the first wireless signal is detected; and determining a location of the first access control in response to the location of the mobile device and the distance between the mobile device and the first access control.

In addition to one or more of the features described above, or as an alternative, further embodiments may include that the first wireless signal is advertised by the first access control and the mobile device is configured to detect the first wireless signal.

In addition to one or more of the features described above, or as an alternative, further embodiments may include that the first wireless signal is advertised by the mobile device and the access control is configured to detect the first wireless signal.

In addition to one or more of the features described above, or as an alternative, further embodiments may include: generating a map depicting the location of the first access control.

In addition to one or more of the features described above, or as an alternative, further embodiments may include that the first wireless signal is a Bluetooth signal.

In addition to one or more of the features described above, or as an alternative, further embodiments may include that the location of the mobile device is determined using at least one of GPS and RSSI of wireless signals between the mobile device and a wireless access protocol device having a known location.

In addition to one or more of the features described above, or as an alternative, further embodiments may include: detecting a first noise proximate the location of the first access control; associating the first noise with the location of the first access control; detecting a second noise proximate the location of the first access control; determining that the second noise is about equivalent to the first noise; and confirming the mobile device is in the location of the first access control in response to the first noise and the second noise.

According to another embodiment, a method of determining a location of one or more access controls utilizing an individual carrying a mobile device is provided. The method including: detecting a first wireless signal; determining a received signal strength indicator (RSSI) of the first wireless signal; determining a distance between a mobile device and a first access control in response to the RSSI of the first wireless signal; detecting a second wireless signal; determining a RSSI of the second wireless signal; determining a distance between a mobile device and a second access control in response to the RSSI of the second wireless signal; and determining a distance between the first access control and the second access control in response to the RSSI of the first wireless signal and the RSSI of the second wireless signal.

In addition to one or more of the features described above, or as an alternative, further embodiments may include: determining a location of the mobile device when the first wireless signal is detected; and determining a location of the first access control in response to the location of the mobile device when the first wireless signal is detected and the distance between the mobile device and the first access control.

In addition to one or more of the features described above, or as an alternative, further embodiments may include: determining a location of the second access control in response to the location of the first access control and the distance between the first access control and the second access control.

In addition to one or more of the features described above, or as an alternative, further embodiments may include: determining a second location of the mobile device when the second wireless signal is detected; and determining a location of the second access control in response to the location of the mobile device when the second wireless signal is detected and the distance between the mobile device and a second access control.

In addition to one or more of the features described above, or as an alternative, further embodiments may include that the first wireless signal is advertised by the first access control, the second wireless signal is advertised by the second access control, and the mobile device is configured to detect the first wireless signal and the second wireless signal.

In addition to one or more of the features described above, or as an alternative, further embodiments may include that the first wireless signal and the second wireless signal are advertised by the mobile device, the first access control is configured to detect the first wireless signal, and the second access control is configured to detect the second wireless signal.

In addition to one or more of the features described above, or as an alternative, further embodiments may include: generating a map depicting a location of the first access control relative to a location of the second access control.

In addition to one or more of the features described above, or as an alternative, further embodiments may include: generating a map depicting the location of the first access control and the location of the second access control.

In addition to one or more of the features described above, or as an alternative, further embodiments may include: generating a map depicting the location of the first access control and the location of the second access control.

In addition to one or more of the features described above, or as an alternative, further embodiments may include that the first wireless signal and the second wireless signals are Bluetooth signals.

In addition to one or more of the features described above, or as an alternative, further embodiments may include that the location of the mobile device is determined using at least one of GPS and RSSI of wireless signals between the mobile device and a wireless access protocol device having a known location.

In addition to one or more of the features described above, or as an alternative, further embodiments may include: detecting a first noise proximate the location of the first access control; associating the first noise with the location of the first access control; detecting a second noise proximate the location of the first access control; determining that the second noise is about equivalent to the first noise; and confirming the mobile device is in the location.

According to another embodiment, a computer program product tangibly embodied on a computer readable medium is provided. The computer program product including instructions that, when executed by a processor, cause the processor to perform operations including: detecting a first wireless signal; determining a received signal strength indicator (RSSI) of the first wireless signal; determining a distance between a mobile device and a first access control in response to the RSSI of the first wireless signal; determining a location of the mobile device when the first wireless signal is detected; and determining a location of the first access control in response to the location of the mobile device and the distance between the mobile device and the first access control.

Technical effects of embodiments of the present disclosure include tracking a location, position, and movement of a mobile device relative to access controls in order to map the relative location of multiple access controls.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The following descriptions should not be considered limiting in any way. With reference to the accompanying drawings, like elements are numbered alike:

Figure 3:
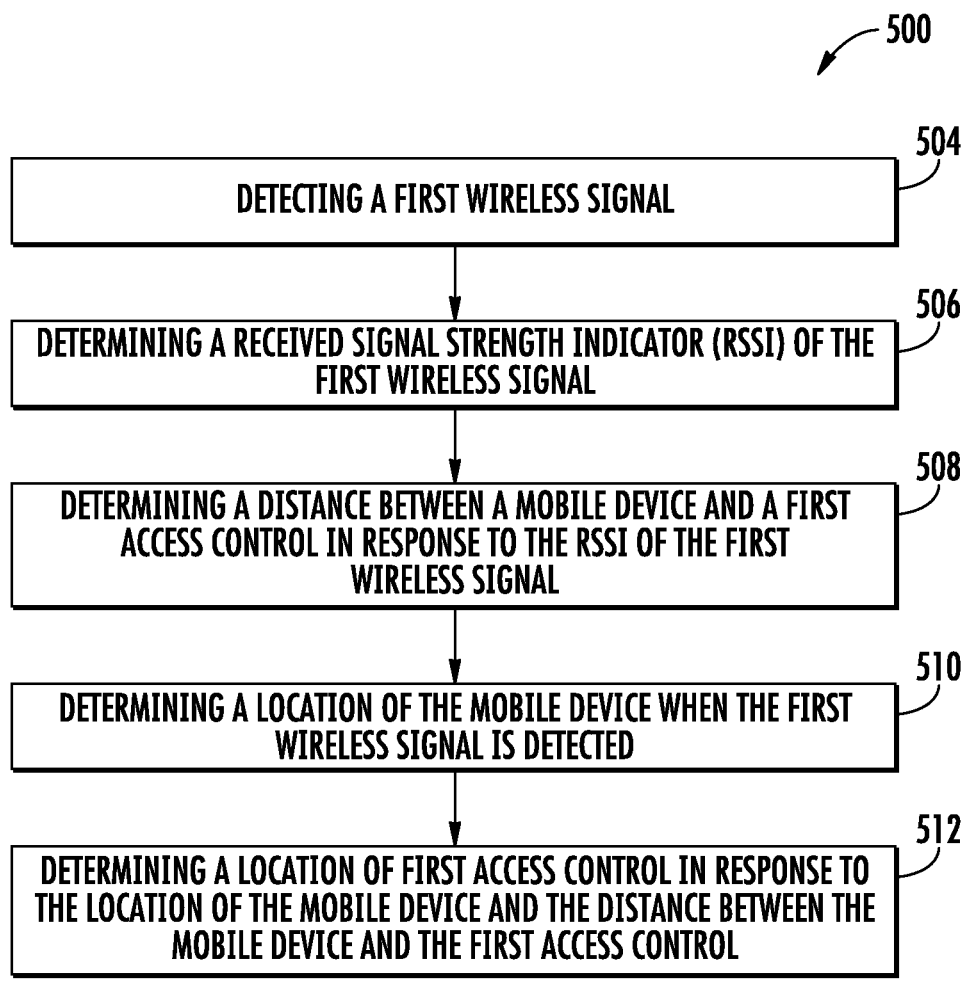
Figure 4:
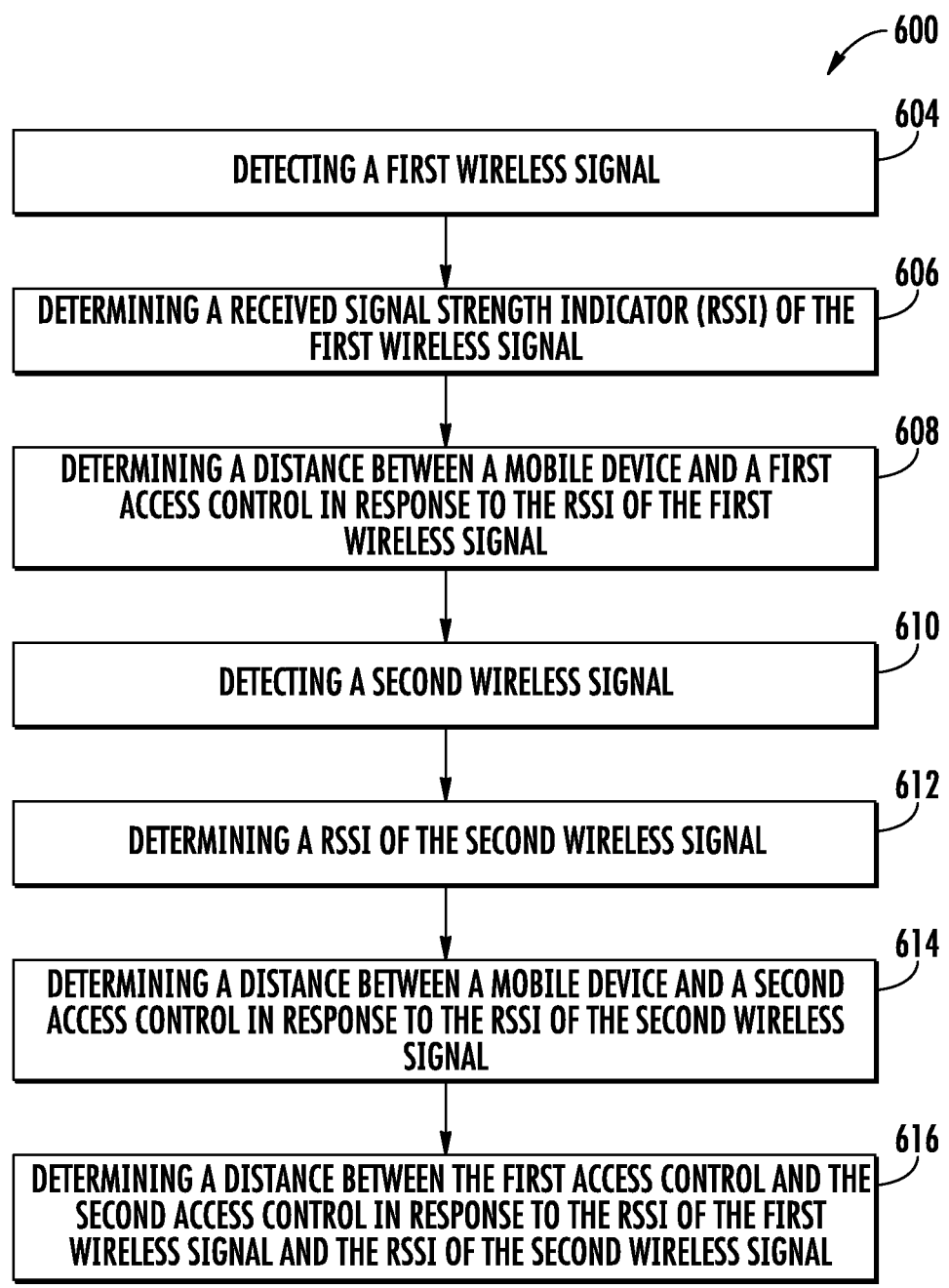

FIG. 3 is a flow diagram illustrating a method of determining a location of one or more access controls utilizing an individual carrying a mobile device, according to an embodiment of the present disclosure; and FIG. 4 is a flow diagram illustrating a method of determining a location of one or more access controls utilizing an individual carrying a mobile device, according to an embodiment of the present disclosure.

DETAILED DESCRIPTION

A detailed description of one or more embodiments of the disclosed apparatus and method are presented herein by way of exemplification and not limitation with reference to the Figures.

Figure 1:
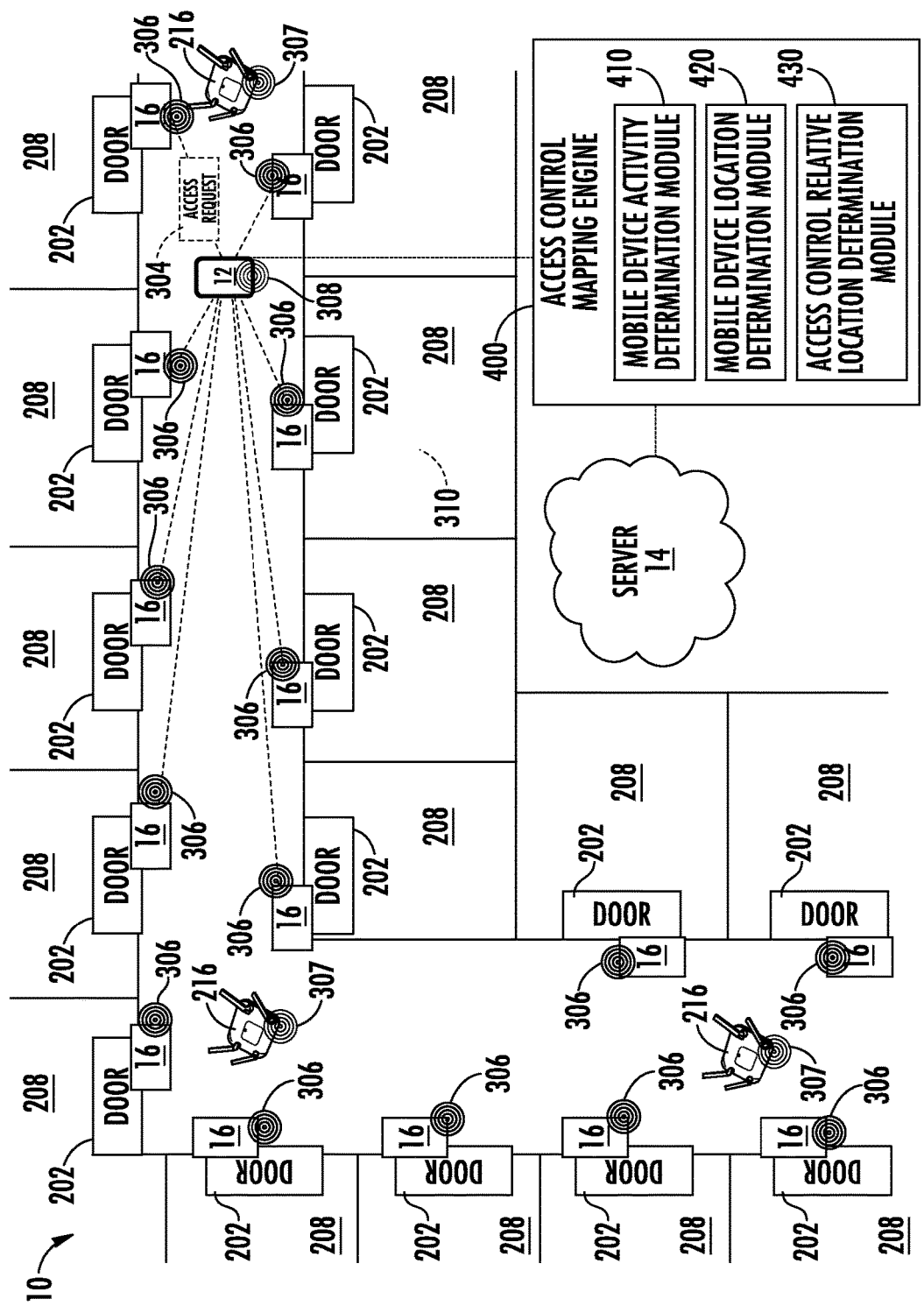
FIG. 1 illustrates a general schematic system diagram of an access control system, in accordance with an embodiment of the disclosure.

FIG. 1 schematically illustrates an access control system 10. The system 10 generally includes a mobile device 12, a server 14, a wireless access protocol device 216, and an access control 16. The access control system 10 may include any number of access controls 16. It should be appreciated that, although particular systems are separately defined in the schematic block diagrams, each or any of the systems may be otherwise combined or separated via hardware and/or software. In the illustrated embodiment, the access controls 16 may control access through a door 202 to a room 208. The access control system 10 may include any number of doors 202 and rooms 208. Further, there may be multiple doors 202 and access controls 16 for each room 208. It is understood that while the access control system 10 utilizes a door 202 and room 208 system for exemplary illustration, embodiments disclosed herein may be applied to other access control systems such as, for example, elevators, turnstiles, safes, cars, garage doors, etc.

A mobile device 12 belonging to an individual may be granted access to one or more access controls 16 (e.g. the door lock on an office or hotel room assigned to the individual). In one example, when an individual begins working at a new building their mobile device 12 will be granted access to particular rooms 208 where they are allowed to enter and/or work. In another example, when an individual checks into the hotel room their mobile device 12 will be granted access to a room 208. There may be one or more mobile devices 12 assigned to a room 208 (e.g. a husband and a wife in a hotel; or multiple workers in a collaborative workspace), thus embodiments disclosed herein may apply to multiple mobile devices per room 208. An individual may utilize their mobile device 12 to unlock and/or lock the access control 16 operably connected to their assigned room 208 through an access request 304. The mobile device 12 may store credentials to unlock and/or lock the access control 16. Some credentials may be used for multiple access controls 16 if there are multiple access controls 16 for a single assigned room 208 or the individual is assigned access to multiple rooms 208. For example, an access control 16 operably connected to an individual's hotel room and an access control 16 operably connected to a hotel pool may respond to the same credential. Other credentials may be specific to a single access control 16.

Wireless communication may occur between the access control 16 and the mobile device 12 via short range wireless communication, such as for example Wi-Fi, Bluetooth, ZigBee, infrared, or any other short-range wireless communication method known to one of skill in the art. In an embodiment, the short-range wireless communication is Bluetooth. The mobile device 12 may have to be within a selected range of the access control 16 in order to utilize short-range wireless communication.

Each access control 16 is a wireless-capable, restricted-access, or restricted-use device such as wireless locks, access control readers for building entry, and other restricted-use machines. The mobile device 12 submits credentials to the access controls 16, thereby selectively permitting a user to actuate (i.e., access or activate) functions of the access controls 16. A user may, for example, submit a credential to an electromechanical lock to unlock it, and thereby gain access to a room 208.

The mobile device 12 may transmit an access request 304 to the access control 16 by short-range radio transmission when the mobile device 12 is placed proximate the access control 16. The mobile device 12 is a wireless capable handheld device such as a smartphone that is operable to communicate with the server 14 and the access controls 16. The server 14 may provide credentials and other data to the access control 16, such as firmware or software updates to be communicated to one or more of the access controls 16. Although the server 14 is depicted herein as a single device, it should be appreciated that the server 14 may alternatively be embodied as a multiplicity of systems, from which the mobile device 12 receives credentials and other data. The access controls 16 may communicate directly with the server 14 or through the wireless access protocol devices 307.

The system 10 may include an location mapping engine 400 configured to determine relative location of one or more access controls 16 as the mobile device 12 is moving among one or more access controls 16. The location mapping engine 400 is comprised of modules including a mobile device activity determination module 410; a mobile device location determination module 420; and an access control relative location determination module 430. Each module 410, 420, 430 may be located on either the mobile device 12 or the server 14. Alternatively, the modules 410, 420, 430 may be distributed between the mobile device 12 and the server 14.

The mobile device activity determination module 410 uses an inertial measurement unit (IMU) sensor 57 (see FIG. 2) on the mobile device 12 to detect a position of the mobile device 12 (e.g., how the mobile device 12 is carried by the user: in a hand of an individual, a back pocket of an individual, a front pocket of an individual) and an activity of an individual carrying the mobile device 12 (e.g., sitting, standing, moving, slowing, accelerating, and stopping). The IMU sensor 57 may be composed of one or more sensors including but not limited to an accelerometer and a light sensor.

The mobile device location determination module 420 is configured to determine a location of the mobile device 12 relative to one or more access controls 16 in response to positional data. The collection of positional data is discussed further below. The mobile device location determination module 420 is configured to further refine the location of the mobile device 12 in response to the position of the mobile device 12 detected by the mobile device activity determination module 410 (e.g., a different location offset is applied if the mobile device 12 is in back pocket vs. front pocket of the individual carrying the mobile device 12). Knowing the position of the mobile device 12 is advantageous because the human body can cause interference in signal strength for wireless signals (e.g., Wi-Fi, Bluetooth, etc.), thus having the mobile device 12 in front or back pocket may cause the mobile device 12 to be in direct line of sight of the access control 16 or position an individual's body in between the mobile device 12 and the access control 16. The mobile device location determination module 420 may also determine a location of the mobile device 12 using GPS or single strength detection between the mobile device 12 and a wireless access protocol device 216.

The location of the mobile device 12 may also be tracked and/or reaffirmed using background noise levels captured using microphone data. In an embodiment, a microphone 59 of the mobile device 12 is used to capture background noise as an individual carrying the mobile device 12 is moving. The mobile device 12 is configured to detect sound using microphone 59 and associate that sound with the current location of the mobile device 12. For example, the sound of walking on a carpeted floor is different from the sound of walking on a tiled floor. Advantageously, associating a particular sound with a specific location may be useful in various other downstream tasks, which are using such information. Further, sound association with a particular location can be learned using data from single mobile device 12 and/or multiple mobile devices 12 that are active in a region. The data gleamed from multiple mobile devices 12 can then be uploaded to a cloud server 14 where such features are learned.

The access control relative location determination 430 is configured to generate a map of the location of each access control 16 in response and the location of the mobile device 12. In a few non-limiting example the map may be graphical, pictorial, or a coordinate matrix. In another example, the fingerprint array 440 may be the representation, which captures the relative location information. In yet another example, if the location/coordinates of a few "anchor" nodes (e.g., access controls 16) are known, then this information can be used along with the fingerprint array 440 and a wireless signal propagation model to compute a coordinate matrix for each access control 16. The map may depict the access controls 16 relative to each other and/or may map the actual location of each access control 16 within a building in a non-limiting example. Advantageously, this allows access control system 10 to be installed with increased speed and accuracy because the location of each access control 16 is determined automatically. Also advantageously, this allows the access controls 16 within the access control system 10 to be rearranged and the location of each access control 16 to be mapped automatically by an individual carrying a mobile device 12.

The access control 16 may be configured to continuously advertise a wireless signal 306. For example, the wireless signal 306 of the access control 16 may be a Bluetooth signal, which may be looking to connect to a mobile device 12. The mobile device 12 is configured to detect the wireless signal 306 and then determine distance between the mobile device 12 and each access control 16 in response to a signal strength of the wireless signal 306. The distance determined may be then adjusted in response to a position of the mobile device 12 or an activity of the mobile device 12, as discussed above.

In another embodiment, the mobile device 12 may be configured to advertise a wireless signal 308. For example, the wireless signal 308 of the mobile device may be looking to connect to the access controls 16. The access controls 16 may be configured to detect the wireless signal 308 and then determine distance between the mobile device 12 and each access control 16 in response to a signal strength of the wireless signal 306. In an embodiment, each access control 16 may detect the wireless signal, determine the wireless signal strength, and then pass this information off to the server 14 to determine the approximate distance between the mobile device 12 and each access control 16. The distance determined may be then adjusted in response to a position of the mobile device 12 or an activity of the mobile device 12, as discussed above.

Wireless signal interaction data between the mobile device 12 and the access device 216 may transmitted to the server 14 to determined positional data. The server may use signal strength detected between the mobile device 12, access controls 16, and the wireless access protocol device 216 to determine positional data of the mobile device 12.

Figure 2:
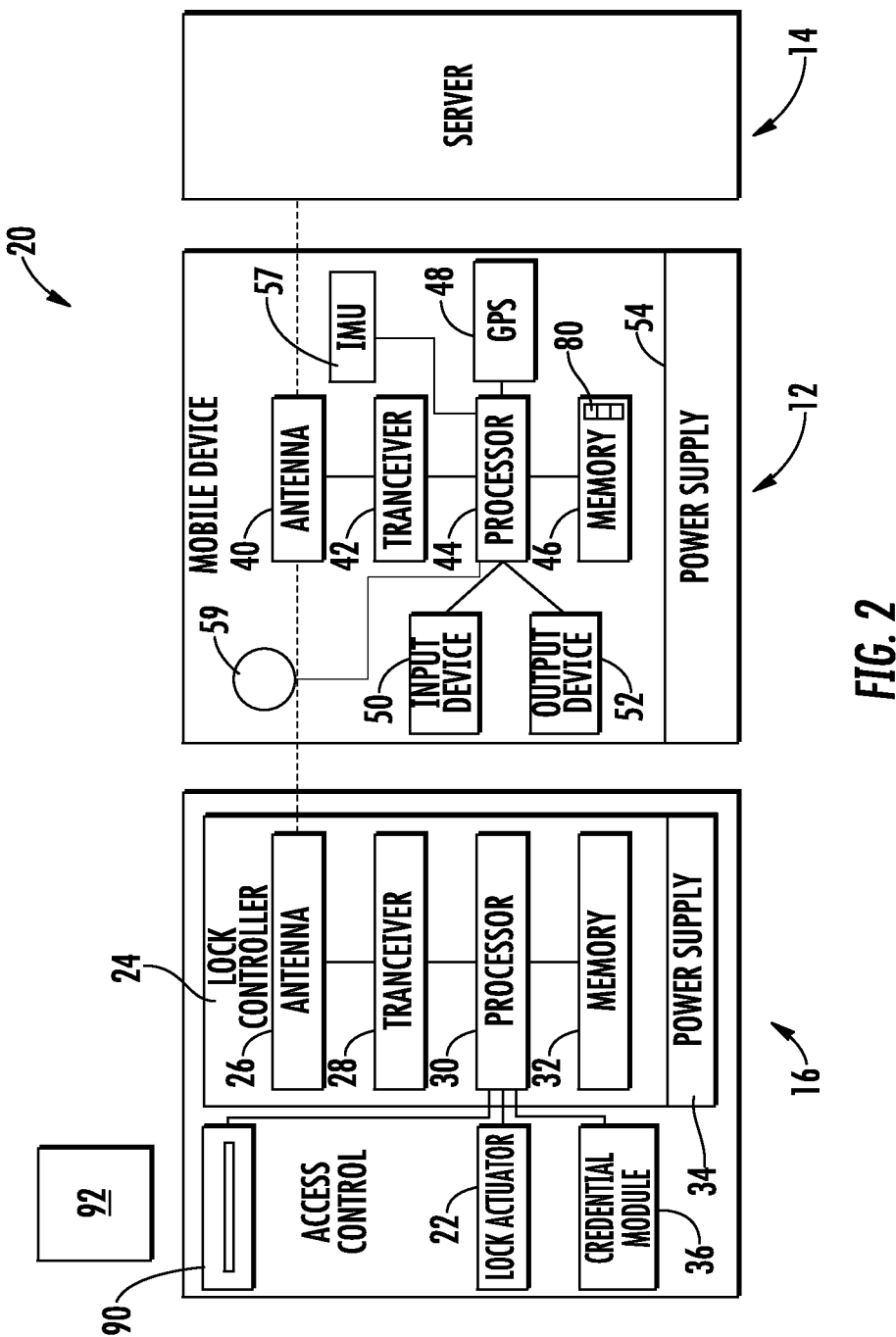
FIG. 2 illustrates a block diagram of an access control, mobile device and server of the access control system of FIG. 1, in accordance with an embodiment of the disclosure.

Referring now to FIG. 2 with continued reference to FIG. 1. FIG. 2 shows a block diagram of an example electronic lock system 20 includes the access control 16, the mobile device 12, and the server 14. The access control 16 generally includes a lock actuator 22, a lock controller 24, a lock antenna 26, a lock transceiver 28, a lock processor 30, a lock memory 32, a lock power supply 34, a lock card reader 90 and a credential module 36. The access control 16 may have essentially two readers, one reader 90 to read a physical key card 92 and the credential module 36 to communicate with the mobile device 12 via the lock processor 30 and the transceiver 28 and antenna 26. In addition to utilizing the mobile device 12 to actuator the access control 16, a physical key card 92 may also be used to actuate the access control 16 by being inserted into the access control 16 for the access control 16 to read the physical key card 92 (e.g. a magnetic strip on an encoded card 92). The physical key card 92 is capable of being encoded with card data, such as, for example, a magnetic strip or RFID chip. The card data may include credentials to grant access to a specific access control 16. For example, for a period the mobile device 12 may be granted access to a specific access control 16, such as, for example, a period of stay/employment for the individual possessing the mobile device 12.

The access control 16 is responsive to credentials from the mobile device 12, and may, for example, be the lock of a turnstile or a door lock. Upon receiving and authenticating an appropriate credential from the mobile device 12 using the credential module 36, or after receiving card data from lock card reader 90, the lock controller 24 commands the lock actuator 22 to lock or unlock a mechanical or electronic lock. The lock controller 24 and the lock actuator 22 may be parts of a single electronic or electromechanical lock unit, or may be components sold or installed separately.

The lock transceiver 28 is capable of transmitting and receiving data to and from at least the mobile device 12. The lock transceiver 28 may, for instance, be a near field communication (NFC), Bluetooth, infrared, ZigBee, or Wi-Fi transceiver, or another appropriate wireless transceiver. The lock antenna 26 is any antenna appropriate to the lock transceiver 28. The lock processor 30 and lock memory 32 are, respectively, data processing, and storage devices. The lock processor 30 may, for instance, be a microprocessor that can process instructions to validate credentials and determine the access rights contained in the credentials or to pass messages from a transceiver to a credential module 36 and to receive a response indication back from the credential module 36. The lock memory 32 may be RAM, EEPROM, or other storage medium where the lock processor 30 can read and write data including but not limited to lock configuration options. The lock power supply 34 is a power source such as line power connection, a power scavenging system, or a battery that powers the lock controller 24. In other embodiments, the lock power supply 34 may only power the lock controller 24, with the lock actuator 22 powered primarily or entirely by another source, such as user work (e.g. turning a bolt).

While FIG. 2 shows the lock antenna 26 and the transceiver 28 connected to the processor 30, this is not to limit other embodiments that may have additional antenna 26 and transceiver 28 connected to the credential module 36 directly. The credential module 36 may contain a transceiver 28 and antenna 26 as part of the credential module. Or the credential module 36 may have a transceiver 28 and antenna 26 separately from the processor 30 which also has a separate transceiver 28 and antenna 26 of the same type or different. In some embodiments, the processor 30 may route communication received via transceiver 28 to the credential module 36. In other embodiments the credential module may communicate directly to the mobile device 12 through the transceiver 28.

The mobile device 12 generally includes a key antenna 40, a key transceiver 42, a key processor 44, a key memory 46, a GPS receiver 48, an input device 50, an output device 52, a key power supply 54, a microphone 59, and an IMU sensor 57. The key transceiver 42 is a transceiver of a type corresponding to the lock transceiver 28, and the key antenna 40 is a corresponding antenna. In some embodiments, the key transceiver 42 and the key antenna 40 may also be used to communicate with the server 14. In other embodiments, one or more separate transceivers and antennas may be included to communicate with server 14. The key memory 46 is of a type to store a plurality of credentials locally on the mobile device 12. The mobile device 12 may also include a mobile device application 80. Embodiments disclosed herein, may operate through the mobile device application 80 installed on the mobile device 12. The IMU sensor 57 may be a sensor such as, for example, an accelerometer, a gyroscope, or a similar sensor known to one of skill in the art. The microphone 59 is configured to detect sound.

Referring now to FIG. 3 with continued reference to FIGS. 1-2. FIG. 3 shows a flow chart of a method 500 of determining a location of one or more access controls 16 utilizing an individual carrying a mobile device 12. The method 500 may be performed by the mobile device 12 and/or the server 14. At block 504, a first wireless signal 306, 308 is detected. In an embodiment, the wireless signal 306, 308 is Bluetooth. In another embodiment, the first wireless signal 306 is advertised by the first access control 16 and the mobile device 12 is configured to detect the first wireless signal 306. In another embodiment, the first wireless signal 308 is advertised by the mobile device 12 and the access control 16 is configured to detect the first wireless signal 308.

At block 506, a received signal strength indicator (RSSI) of the first wireless signal 306, 308 is determined. At block 508, a distance between a mobile device 12 and a first access control 16 is determined in response to the RSSI of the first wireless signal 306, 308. At block 510, a location of the mobile device 12 is determined when the first wireless signal 306, 308 is detected. In an embodiment, the location of the mobile device 12 is determined using GPS. In another embodiment, the location of the mobile device 12 is determined using RSSI of wireless signals 307 between the mobile device 12 and a wireless access protocol device 216 having a known location.

At block 512, a location of the first access control 16 is determined in response to the location of the mobile device 12 and the distance between the mobile device 12 and the first access control 16. The method 500 may include: generating a map depicting the location of the first access control 16.

The location of the first access control 16 may be confirmed using sound detected by the microphone 59 of the mobile device 12 when the mobile device is located proximate the location of the first access control 16. For example, the method 500 may further comprise: detecting a first noise proximate the location of the first access control 16; associating the first noise with the location of the first access control 16; detecting a second noise proximate the location of the first access control 16; determining that the second noise is about equivalent to the first noise; and confirming the mobile device 12 is in the location of the first access control 16 in response to the first noise and the second noise.

While the above description has described the flow process of FIG. 3 in a particular order, it should be appreciated that unless otherwise specifically required in the attached claims that the ordering of the steps may be varied.

Referring now to FIG. 4 with continued reference to FIGS. 1-2. FIG. 4 shows a flow chart of a method 600 of determining a location of one or more access controls 16 utilizing an individual carrying a mobile device 12. At block 604, a first wireless signal 306, 308 is detected. In an embodiment, the wireless signal 306, 308 is Bluetooth. In another embodiment, the first wireless signal 306 is advertised by the first access control 16 and the mobile device 12 is configured to detect the first wireless signal 306. In another embodiment, the first wireless signal 308 is advertised by the mobile device 12 and the access control 16 is configured to detect the first wireless signal 308. At block 606, a received signal strength indicator (RSSI) of the first wireless signal 306, 308 is determined. At block 608, a distance between a mobile device 12 and a first access control 16 is determined in response to the RSSI of the first wireless signal.

At block 610, a second wireless signal 306, 308 is detected. In an embodiment, the second wireless signal 306, 308 is Bluetooth. In another embodiment, the second wireless signal 306 is advertised by the second access control 16 and the mobile device 12 is configured to detect the second wireless signal 306. In another embodiment, the second wireless signal 308 is advertised by the mobile device 12 and the access control 16 is configured to detect the second wireless signal 308. At block 612, a received signal strength indicator (RSSI) of the second wireless signal 306, 308 is determined. At block 614, a distance between a mobile device 12 and a first access control 16 is determined in response to the RSSI of the second wireless signal 306, 308. At block 616, a distance between the first access control 16 and the second access control 16 is determined in response to the RSSI of the first wireless signal 306, 308 and the RSSI of the second wireless signal 306, 308.

The method 600 may further include: determining a location of the mobile device 12 when the first wireless signal 306, 308 is detected; and determining a location of the first access control 16 in response to the location of the mobile device 12 when the first wireless signal 306, 308 is detected and the distance between the mobile device 16 and the first access control 16. In an embodiment, a location of the second access control 16 may be determined in response to the location of the first access control 16 and the distance between the first access control 16 and the second access control 16. In another embodiment, a location of the second access control 16 may be determined by: determining a second location of the mobile device 16 when the second wireless signal 306, 308 is detected; and determining a location of the second access control 16 in response to the location of the mobile device 12 when the second wireless signal 306, 308 is detected and the distance between the mobile device 12 and the second access control 16.

In an embodiment, the location of the mobile device 12 is determined using GPS. In another embodiment, the location of the mobile device 12 is determined using RSSI of wireless signals 307 between the mobile device 12 and a wireless access protocol device 216 having a known location.

The location of the first access control 16 may be confirmed using sound detected by the microphone 59 of the mobile device 12 when the mobile device is located proximate the location of the first access control 16. For example, the method 600 may further comprise: detecting a first noise proximate the location of the first access control 16; associating the first noise with the location of the first access control 16; detecting a second noise proximate the location of the first access control 16; determining that the second noise is about equivalent to the first noise; and confirming the mobile device 12 is in the location of the first access control 16 in response to the first noise and the second noise.

The method 600 may include: generating a map depicting the location of the first access control 16 and the location of the second access control 16 or a location of the first access control 16 relative to a location of the second access control 16.

While the above description has described the flow process of FIG. 4 in a particular order, it should be appreciated that unless otherwise specifically required in the attached claims that the ordering of the steps may be varied.

As described above, embodiments can be in the form of processor-implemented processes and devices for practicing those processes, such as a processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the embodiments. When implemented on a general-purpose microprocessor, the computer program code segments configure the microprocessor to create specific logic circuits.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of determining a location of one or more access controls utilizing an individual carrying a mobile device, the method comprising:
   detecting a first wireless signal;
   determining a received signal strength indicator (RSSI) of the first wireless signal;
   determining a distance between a mobile device and a first access control in response to the RSSI of the first wireless signal;
   determining a location of the mobile device when the first wireless signal is detected;
   determining a location of the first access control in response to the location of the mobile device and the distance between the mobile device and the first access control;
   detecting a first noise proximate the location of the first access control;
   associating the first noise with the location of the first access control;
   detecting a second noise proximate the location of the first access control;
   determining that the second noise is about equivalent to the first noise; and
   confirming the mobile device is in the location of the first access control in response to the first noise and the second noise.

2. The method of claim 1, wherein the first wireless signal is advertised by the first access control and the mobile device is configured to detect the first wireless signal.

3. The method of claim 1, wherein the first wireless signal is advertised by the mobile device and the access control is configured to detect the first wireless signal.

4. The method of claim 1, further comprising:
   generating a map depicting the location of the first access control.

5. The method of claim 1, wherein the first wireless signal is a Bluetooth signal.

6. The method of claim 1, wherein the location of the mobile device is determined using at least one of GPS and RSSI of wireless signals between the mobile device and a wireless access protocol device having a known location.

7. A method of determining a location of one or more access controls utilizing an individual carrying a mobile device, the method comprising:
   detecting a first wireless signal;
   determining a received signal strength indicator (RSSI) of the first wireless signal;
   determining a distance between a mobile device and a first access control in response to the RSSI of the first wireless signal;
   detecting a second wireless signal;
   determining a RSSI of the second wireless signal;
   determining a distance between a mobile device and a second access control in response to the RSSI of the second wireless signal; and
   determining a distance between the first access control and the second access control in response to the RSSI of the first wireless signal and the RSSI of the second wireless signal.

8. The method of claim 7, further comprising:
   determining a location of the mobile device when the first wireless signal is detected; and
   determining a location of the first access control in response to the location of the mobile device when the first wireless signal is detected and the distance between the mobile device and the first access control.

9. The method of claim 8, further comprising:
   determining a location of the second access control in response to the location of the first access control and the distance between the first access control and the second access control.

10. The method of claim 8, further comprising:
    determining a second location of the mobile device when the second wireless signal is detected; and
    determining a location of the second access control in response to the location of the mobile device when the second wireless signal is detected and the distance between the mobile device and a second access control.

11. The method of claim 7, wherein the first wireless signal is advertised by the first access control, the second wireless signal is advertised by the second access control, and the mobile device is configured to detect the first wireless signal and the second wireless signal.

12. The method of claim 7, wherein the first wireless signal and the second wireless signal are advertised by the mobile device, the first access control is configured to detect the first wireless signal, and the second access control is configured to detect the second wireless signal.

13. The method of claim 7, further comprising:
    generating a map depicting a location of the first access control relative to a location of the second access control.

14. The method of claim 9, further comprising:
    generating a map depicting the location of the first access control and the location of the second access control.

15. The method of claim 10, further comprising:
    generating a map depicting the location of the first access control and the location of the second access control.

16. The method of claim 7, wherein the first wireless signal and the second wireless signals are Bluetooth signals.

17. The method of claim 8, wherein the location of the mobile device is determined using at least one of GPS and RSSI of wireless signals between the mobile device and a wireless access protocol device having a known location.

18. The method of claim 8, further comprising:
    detecting a first noise proximate the location of the first access control;
    associating the first noise with the location of the first access control;
    detecting a second noise proximate the location of the first access control;
    determining that the second noise is about equivalent to the first noise; and
    confirming the mobile device is in the location.

19. A computer program product tangibly embodied on a non-transitory computer readable medium, the computer program product including instructions that, when executed by a processor, cause the processor to perform operations comprising:
    detecting a first wireless signal;
    determining a received signal strength indicator (RSSI) of the first wireless signal;
    determining a distance between a mobile device and a first access control in response to the RSSI of the first wireless signal;
    determining a location of the mobile device when the first wireless signal is detected;

determining a location of the first access control in response to the location of the mobile device and the distance between the mobile device and the first access control;
detecting a first noise proximate the location of the first access control;
associating the first noise with the location of the first access control;
detecting a second noise proximate the location of the first access control;
determining that the second noise is about equivalent to the first noise; and
confirming the mobile device is in the location of the first access control in response to the first noise and the second noise.

* * * * *